United States Patent Office 3,658,831
Patented Apr. 25, 1972

3,658,831
PROCESS FOR THE PREPARATION OF N-CAR-
BOXYLIC ACID ANHYDRIDES OF GLUTAMIC
ACID-γ-ESTERS
Yasuo Fujimoto, Keizo Tatsukawa, and Masayuki Terani-
shi, Machida-shi, and Yoichi Koiwa, Tokyo, Japan,
assignors to Kyowa Hakko Kogyo Co., Ltd., Tokyo,
Japan
No Drawing. Filed Jan. 7, 1969, Ser. No. 789,972
Claims priority, application Japan, Jan. 12, 1968,
43/1,279
Int. Cl. C07d 85/34
U.S. Cl. 260—307 B                                      10 Claims

ABSTRACT OF THE DISCLOSURE

A process for the preparation of N-carboxylic acid anhydrides of glutamic acid-γ-esters which comprises suspending a glutamic acid-γ-ester in a solvent mixture of an aromatic hydrocarbon, for example, benzene, toluene or xylene, and an organic nitrile, for example, acetonitrile, propionitrile or acrylonitrile, and reacting the same with phosgene. Preferably, about 40% or less by volume of the nitrile is employed. The process provides products substantially free of halogen impurities, which products can be polymerized to polyglutamic acid-γ-esters.

---

The present invention relates to a process for the preparation of N-carboxylic acid anhydrides of glutamic acid-γ-esters having the general formula:

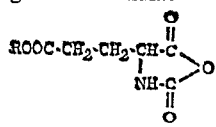

or

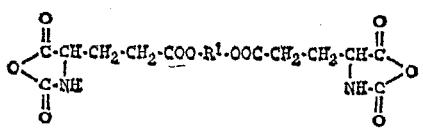

wherein R and $R^1$ represent an ester residue (for the sake of simplicity, N-carboxylic acid anhydrides of glutamic acid-γ-esters are referred to hereinafter as G-NCA, while N-carboxylic acid anhydrides per se are referred to as NCA). More particularly, the invention relates to a process for the production of G-NCA which are substantially free of impurities. Even more particularly, the invention relates to a process for producing G-NCA which are substantially free of impurities, including halogens, the process comprising suspending γ-esters of glutamic acid in an organic solvent and reacting the same with phosgene.

As is well known in the art, G-NCA of the formula shown hereinabove are readily polymerized into polyglutamic acid-γ-esters having the formula,

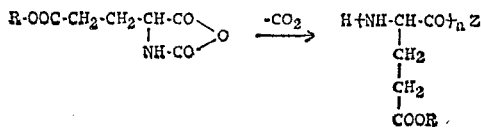

wherein R is an ester residue; Z is OH, $NH_2$, or an amide or ester residue; and $n$ is a positive integer, by the release of carbon dioxide in the presence of a suitable initiator (for example, an organic basic compound such as diethylamine or triethylamine), this reaction being effected in a suitable organic solvent (for example, a halogenated hydrocarbon such as dichloroethane, dichloromethane, chloroform or tetrachloroethane; an ester such as ethyl acetate; an ether such as dioxane; or mixtures thereof). The resultant polyglutamic acid - γ - esters are known to be model substances of protein and also to be useful materials for the production of synthetic fibers and synthetic leathers. However, it is essential to obtain very highly pure G-NCA derivatives in order to produce polyglutamic acid-γ-esters having a high degree of polymerization and high quality. Side reaction products contained in G-NCA, such as isocyanates, carbamoyl chlorides and the like of the starting glutamic acid-γ-esters employed, lower the quality of the resultant polyglutamic acid-γ-esters. Therefore, complicated methods of purification to remove such impurities have been used in the prior art.

Halogen-containing compounds, in particular, are impurities which constitute a serious drawback in producing polyglutamic acid-γ-esters having a high degree of polymerization and a high quality [note, for example, J. Am. Chem. Soc., vol. 76, p. 4492 (1954)]. For this reason, G-NCA is normally recrystallized several times before it can be used [Noguchi et al., Annual Report No. 17 of the Institute of Textile Science in Japan, p. 30 (1964)].

Heretofore, it has been believed that G-NCA may be conveniently synthesized by suspending glutamic acid-γ-esters in inert solvents (for example, ethers, such as dioxane, and aromatic hydrocarbons, such as benzene and toluene) and reacting the same with phosgene at low temperatures, i.e., not higher than 50° C. [note, for example, "Synthetic Polypeptide," Academic Press Inc. Publishers, New York, N.Y., p. 31 (1956) and Farthing, J. Chem. Soc., p. 3213 (1950)]. A process is disclosed in Japanese patent publication No. 7,382/67 and No. 94/65 which comprises reacting glutamic acid-γ-esters with phosgene in halogenated hydrocarbons. All of these processes have the drawback that the yield of product is low and/or product G-NCA is colored or contains a high percentage of halogen-containing impurities. A further disadvantage is that a prolonged reaction time is required.

The reaction of glutamic acid-γ-esters with phosgene to give G-NCA is represented by the following scheme:

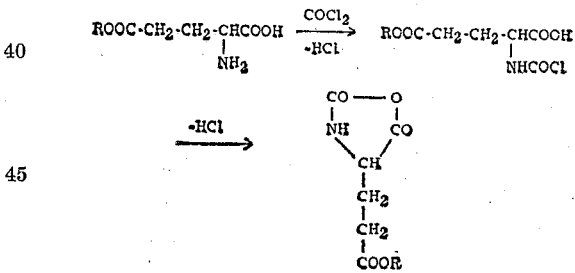

[see "Advance in Protein Chemistry," vol. 8, Academic Press Inc. Publishers, New York, N.Y., p. 268 (1958)].

Having noticed the fact that hydrogen chloride is withdrawn from the reaction product between the amino acid ester and phosgene in the G-NCA synthesizing reaction shown above, the present inventors conducted research with a view toward selecting a solvent and reaction conditions which would facilitate the withdrawal of the hydrogen chloride. Research was also conducted with a view toward shortening the duration of contact time between the starting material and the phosgene in order to prevent side reactions, such as those represented by the following reaction scheme:

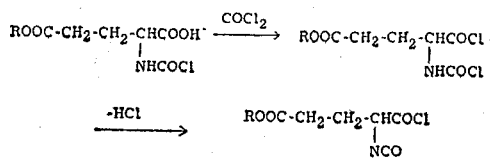

Such side reactions are believed to occur if a prolonged reaction time between the amino acid ester and phosgene is used. As a result, the present inventors previously found that the hydrogen chloride-removing reaction takes place highly efficiently in a short period of time and that G-NCA, substantially free of halogen impurity, can be successfully produced when the amino acid ester is reacted with phosgene in aliphatic nitriles, such as acetonitrile and propionitrile, or in halogenated aliphatic and aromatic hydrocarbons, at elevated temperatures (Japanese patent applications Nos. 3,859/67 and 30,877/67, corresponding to U.S. application Ser. Nos. 697,576 and 729,460, respectively).

Subsequent studies conducted by the present inventors on the G-NCA synthesizing reaction have revealed the following facts. Specifically, when aromatic hydrocarbons, such as benzene and toluene, are used as a solvent, there is generally a great tendency for side reactions to occur, and thus considerable amounts of colored or tarry substances are produced as by-products. Therefore, it is very difficult to obtain G-NCA of high purity even by recrystallizing the reaction product several times. It is for this reason that the aromatic hydrocarbons, such as benzene and toluene, have not been used in the synthesis of G-NCA, although they have many advantages in that they can be obtained very easily for industrial use at low costs and they are not corrosive against the reaction apparatus used.

On the other hand, when G-NCA is produced in a nitrile solvent, such as acetonitrile, it becomes essential to remove a large part of the solvent by distillation under reduced pressure in order to isolate the G-NCA upon completion of the reaction, because the solvent is highly soluble in the G-NCA, with the result that the G-NCA cannot be crystallized simply by cooling or by the addition of a poor solvent such as petroleum ether, as can be done when halogenated hydrocarbon-type solvents are used. In addition, the G-NCA crystals are not always precipitated only by the removal of the solvent by distillation, and a tarry substance will be obtained. In order to precipitate the G-NCA crystals from the tarry substance, a complicated process is required, such as the addition of dry petroleum ether, removal of the ether by distillation and trituration with dry petroleum ether [J. of Polymer Science, Part A–2, vol. 4, p. 183 (1966)]. Furthermore, since the process in which the crystal precipitates from the tarry substance necessitates a delicate procedure, the crystals are not always precipitated by a fixed operation. Still further, the G-NCA thus obtained tends to be colored because of colored substances formed upon decomposition of the G-NCA during the crystallizing operation.

The present inventors have conducted various studies on the synthesis of G-NCA in aromatic hydrocarbon-type solvents, such as benzene, toluene and the like, and in nitriles, such as acetonitrile and the like, and, surprisingly and unexpectedly, it has been found, in accordance with the present invention, that if G-NCA is synthesized in a solvent consisting essentially of a mixture of an aromatic hydrocarbon and a nitrile in an amount of 40% by volume or less with respect to the aromatic hydrocarbon, it is possible not only to eliminate the aforesaid drawbacks and disadvantages of the individual solvents entirely, but also to produce advantageous results which could not be obtained with the use of the conventional solvents. For instance, marked improvements have been obtained as a result of the present invention with respect to yield of product, a lessening in the amount of halogen by-product and in a shortening of the reaction time. These advantages, obtained as a result of using mixed solvents in accordance with the present invention, are shown in Table 1.

TABLE 1

| Amount of glutamic acid-$\gamma$-methyl ester, g. | Aromatic solvent, ml. | Nitriles | Amt. ml. | Yield of G-NCA, percent | Reaction time, min. | Chlorine content in G-NCA, percent | Color |
|---|---|---|---|---|---|---|---|
| | Benzene | | | | | | |
| 40 | 800 | | | 44 | 180 | 0.193 | Dark yellowish brown. |
| 40 | 780 | Acetonitrile | 20 | 91 | 85 | 0.028 | Pure white. |
| 40 | 750 | Propionitrile | 50 | 91 | 85 | 0.019 | Light brown. |
| 40 | 700 | Benzonitrile | 100 | 90 | 75 | 0.018 | Light yellow. |
| 40 | 750 | Acrylonitrile | 50 | 91 | 90 | 0.010 | Pure white. |
| | Xylene | | | | | | |
| 40 | 800 | | | 36 | 195 | 0.213 | Dark yellow. |
| 40 | 750 | Acetonitrile | 50 | 90 | 85 | 0.022 | Pure white. |
| 40 | 750 | Propionitrile | 50 | 90 | 90 | 0.021 | Light yellow. |
| 40 | 700 | Benzonitrile | 100 | 89 | 80 | 0.017 | Light brown. |
| 40 | 750 | Acrylonitrile | 50 | 89 | 80 | 0.019 | Pure white. |
| | Toluene | | | | | | |
| 40 | 800 | | | 38 | 200 | 0.183 | Dark brown. |
| 40 | 750 | Acetonitrile | 50 | 90 | 90 | 0.028 | Pure white. |
| 40 | 750 | Propionitrile | 50 | 89 | 95 | 0.026 | Light pink. |
| 40 | 700 | Benzonitrile | 100 | 90 | 85 | 0.025 | Pure white. |
| 40 | 750 | Acrylonitrile | 50 | 90 | 85 | 0.027 | Do. |

Accordingly, one of the objects of the present invention is to provide an improved process for the preparation of N-carboxylic acid anhydrides of glutamic acid-$\gamma$-esters (G-NCA) which overcomes the disadvantages and deficiencies of the prior art methods.

Another object of the present invention is to provide a process for producing G-NCA which may be carried out in an efficacious and relatively simple manner.

A further object of the invention is to provide a process for the preparation of G-NCA which gives the product in high yield in a relatively short reaction time and with only small quantities of impurities, thereby resulting in a product of high purity.

A still further object of the invention is to provide N-carboxylic acid anhydrides of glutamic acid-$\gamma$-esters.

These and other objects and advantages of the present invention will become apparent to those skilled in the art from a consideration of the following specification and claims.

As can be seen from Table 1 hereinabove, the reaction proceeds substantially quantitatively in the mixed solvents of the invention with a minimum of side reactions, thus resulting in G-NCA products of extremely high purity and low color. By polymerizing the G-NCA thus obtained in a suitable solvent using an organic basic compound as an initiator, a viscous, transparent, high quality polymer solution is obtained.

Aromatic hydrocarbon solvents are inexpensive and easily obtainable. Halogenated hydrocarbons and a mixed solvent containing mainly the same are not particularly corrosive. The addition of a small amount of nitriles to such an aromatic hydrocarbon solvent, in accordance with this invention, opens the door to a suspension solvent for G-NCA synthesis. The solvent of the present invention provides a superior effect with respect to any of the conventional solvents used heretofore. This factor is of great significance from a commercial point of view.

Now describing the process of the invention briefly, a glutamic acid-$\gamma$-ester is suspended in a solvent consisting essentially of a mixture of an aromatic hydrocarbon and a nitrile, the latter being present in an amount of 40% by volume or less with respect to said aromatic hydrocarbon. After heating the resultant suspension to 50° C. or higher, phosgene is passed through the suspension until the reaction mixture becomes transparent. Alternatively, the starting material is added to the aforesaid mixed solvent already containing usually 1 to 5 moles of phosgene per mole of the starting material and, thereafter, the resultant reaction mixture is heated to a temperature of from 50° C. to 200° C., whereby the glutamic acid-γ-ester suspended in said reaction mixture is dissolved therein. The reaction mixture usually becomes transparent in 50 to 90 minutes. Thereafter, the reaction mixture is heated for about 5 to 60 minutes in order to effect the reaction, and excess phosgene is removed (and insoluble matters, if any, are separated by filtering) to obtain a clear reaction mixture. Highly pure crystals of G-NCA are precipitated upon cooling the clear reaction mixture. In this case, poor solvents for G-NCA, for example, petroleum ether or aliphatic hydrocarbons, may, of course, be added to the solution. It is also possible to reduce the amount of residual G-NCA in the mother liquor by concentrating the reactant solvent under reduced pressure. Furthermore, the residual phosgene in the reaction mixture may be removed, after completion of the reaction and before the crystallization, by passing an inert gas, such as nitrogen, carbon dioxide or air, through the reaction mixture. If necessary, the G-NCA obtained in the manner described may be recrystallized, although it contains substantially no halogen. If recrystallization is employed, G-NCA can be obtained which is almost completely free of halogen. The reaction is normally carried out at 50° C. or higher, and it is preferable to accomplish the reaction in as short a period of time as possible, because decomposition of the G-NCA and vigorous side reactions will occur at temperatures higher than the melting point (or decomposition point) of the G-NCA obtained by the reaction.

The nitriles used in the present invention may be aliphatic, aromatic, alicyclic or heterocyclic, provided that they have a boiling point not lower than 50° C. and will not interfere with the phosgenating reaction. These nitriles include, for example, acetonitrile, n-propionitrile and isomers thereof, n-butyronitrile and isomers thereof, n-valeronitrile and isomers thereof, n-capronitrile and isomers thereof, enanthonitrile, caprylonitrile, pelargononitrile, caprinitrile, acrylonitrile, crotononitrile, allyl cyanide, malononitrile, succinonitrile, glutaronitrile, adiponitrile, pyruvonitrile, benzonitrile, cyclohexyl cyanide, cyclopentyl cyanide, tolunitrile, benzyl cyanide, naphthonitrile and cyanopyridine.

The glutamic acid-γ-esters used in the present invention may be any of the aliphatic, aromatic and alicyclic esters of either optically active or inactive glutamic acid, provided that the ester residues will not interfere with the phosgenating reaction. These ester residues include, for example, methyl, ethyl, n-propyl and isomers thereof, n-butyl and isomers thereof, n-pentyl and isomers thereof, n-hexyl and isomers thereof, n-heptyl and isomers thereof, n-octyl and isomers thereof, n-nonyl and isomers thereof, n-decyl and isomers thereof, n-dodecyl and isomers thereof, cetyl, stearyl, oleyl, cyclobutyl, cyclopentyl, cyclohexyl, cycloheptyl, cyclooctyl, cyclononyl, cyclodecyl, cyclododecyl, cyclobutylmethyl, cyclopentylmethyl, cyclohexylmethyl, cyclooctylmethyl, methycyclobutyl, methylcyclopenyl, methylcyclohexyl, methylcyclooctyl, phenyl, benzyl, phenylethyl, tolyl (o-, m- or p-), tolylmethyl (o-, m- or p-), xylyl, naphthyl (α- or β-), naphthylmethyl (α- or β-), furfuryl, furyl, tetrahydrofuryl, tetrahydrofurfuryl, and those substituted by halogen, nitro, alkoxy, acyloxy, dialkylamino and acylamino.

Typical examples of G-NCA prepared in accordance with the process of the present invention are:

γ-methyl glutamate-NCA
γ-ethyl glutamate-NCA
γ-(n-propyl) glutamate-NCA
γ-(i-propyl) glutamate-NCA
γ-(n-butyl) glutamate-NCA
γ-(i-butyl) glutamate-NCA
γ-(sec-butyl) glutamate-NCA
γ-(t-butyl) glutamate-NCA
γ-(n-amyl) glutamate-NCA
γ-(sec-amyl) glutamate-NCA
γ-(t-amyl) glutamate-NCA
γ-(active amyl) glutamate-NCA
γ-(n-hexyl) glutamate-NCA
γ-(n-heptyl) glutamate-NCA
γ-(n-octyl) glutamate-NCA
γ-(2-ethylhexyl) glutamate-NCA
γ-cyclobutyl glutamate-NCA
γ-cyclopentyl glutamate-NCA
γ-cyclohexyl glutamate-NCA
γ-cyclootyl glutamate-NCA
γ-cyclodecyl glutamate-NCA
γ-cyclopentylmethyl glutamate-NCA
γ-cyclohexylmethyl glutamate-NCA
γ-(n-nonyl) glutamate-NCA
γ-(n-decyl) glutamate-NCA
γ-(n-dodecyl) glutamate-NCA
γ-cetyl glutamate-NCA
γ-stearyl glutamate-NCA
γ-oleyl glutamate-NCA
γ-phenyl glutamate-NCA
γ-benzyl glutamate-NCA
γ-(β-phenylethyl) glutamate-NCA
γ-(o-tolyl) glutamate-NCA
γ-(p-tolyl) glutamate-NCA
γ-(p-tolylmethyl) glutamate-NCA
γ-[o-(2-chlorotolyl)] glutamate-NCA
γ-methoxymethyl glutamate-NCA
γ-(2-methoxyethyl) glutamate-NCA
γ-(2-ethoxyethyl) glutamate-NCA
γ-(2-chloroethyl) glutamate-NCA
γ-(2-nitroethyl) glutamate-NCA
γ-(2-chloropropyl) glutamate-NCA
γ-(3-chloropropyl) glutamate-NCA
γ-allyl glutamate-NCA
γ-crotyl glutamate-NCA
γ-(p-chlorophenyl) glutamate-NCA
γ-(p-nitrophenyl) glutamate-NCA
γ-(p-chlorobenzyl) glutamate-NCA
γ-(p-nitrobenzyl) glutamate-NCA
γ-(p-methoxyphenyl) glutamate-NCA
γ-(p-methoxybenzyl) glutamate-NCA
γ-(pentachlorophenyl) glutamate-NCA
ethylene glycol di($N^\alpha$-carboxyanhydrido glutamate) [$O^1$, $O^2$-di($N^\alpha$-carboxyanhydridoglutamyl$)$ ethylene glycol]
trimethyl glycol di($N^\alpha$-carboxyanhydrido glutamate) [$O^1$, $O^3$-di($N^\alpha$-carboxyanhydridoglutamyl) ethylene glycol]
hexamethylene glycol di($N^\alpha$-carboxyanhydrido glutamate) [$O^1$, $O^6$ - di($N^\alpha$ - carboxyanhydridoglutamyl) ethylene glycol]

Now, the present invention will be illustrated by way of examples, wherein benzene, toluene and xylene are used as representative aromatic hydrocarbons and acetonitrile, propionitrile and acrylonitrile are used as representative nitriles. It should, however, be understood that these examples are given merely as illustrative of the present invention and are not to be considered as limiting.

EXAMPLE 1

40 g. of γ-methyl-L-glutamate is suspended in a solvent consisting of a mixture of 780 ml. of benzene and 20 ml. of acetonitrile, and phosgene is passed through the suspension for 85 minutes at 75° C. The transparent liquid obtained is refluxed for 15 minutes and then filtered. Upon cooling the filtrate, 42.4 g. of crude crystals of γ-methyl-L-glutamate-NCA is obtained.

M.P.: 98.0° to 99.0° C.
Halogen content: 0.02% (by weight)

EXAMPLE 2

40 g. of γ-methyl-L-glutamate is suspended in a solvent consisting of a mixture of 705 ml. of benzene and 50 ml. of propionitrile, and phosgene is passed through the suspension for 85 minutes at 80° C. The transparent liquid obtained is cooled and 42.5 g. of crude crystals of γ-methyl-L-glutamate-NCA is obtained.

M.P.: 98.0° to 99.5° C.
Halogen content: 0.02%

EXAMPLE 3

40 g. of γ-methyl-D-glutamate is suspended in a solvent consisting of a mixture of 750 ml. of xylene and 50 ml. of acetonitrile, and phosgene is passed through the suspension for 85 minutes at 70° C. The reaction mixture obtained is filtered and the filtrate is maintained at 80° C. for 15 minutes. By concentrating the filtrate, 41.9 g. of crude γ-methyl-D-glutamate-NCA is obtained.

M.P.: 97.0° to 98.0° C.
Halogen content: 0.03%

EXAMPLE 4

40 g. of γ-benzyl-L-glutamate is suspended in a solvent consisting of a mixture of 750 ml. of xylene and 50 ml. of propionitrile, and phosgene is passed through the suspension for 90 minutes at 80° C. Thereafter, the reaction mixture is concentrated under reduced pressure and cooled to 0° C., whereupon 40.1 g. of crude γ-benzyl-L-glutamate-NCA is obtained.

M.P.: 95.5° to 96.5° C.
Halogen content: 0.03%

EXAMPLE 5

80 g. of γ-ethyl-L-glutamate is suspended in a solvent consisting of a mixture of 1,500 ml. of benzene and 100 ml. of acrylonitrile, and phosgene is passed through the suspension for 100 minutes at the boiling point. The transparent liquid obtained is refluxed for 10 minutes and filtered. Upon concentrating the filtrate, 84.0 g. of crude γ-ethyl-L-glutamate-NCA is obtained.

M.P.: 71.5° to 72.5° C.
Halogen content: 0.01%

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A process for the preparation of N-carboxylic acid anhydrides of glutamic acid-γ-esters having the formula:

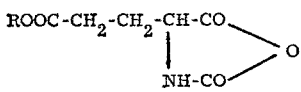

or

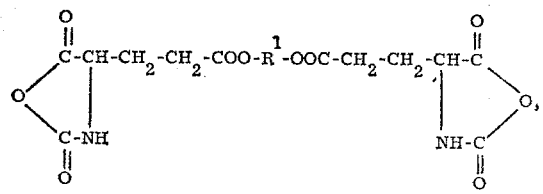

wherein R and R¹ are each an organic ester residue having 1 to 18 carbon atoms, which comprises suspending a glutamic acid-γ-ester having the formula,

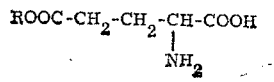

or

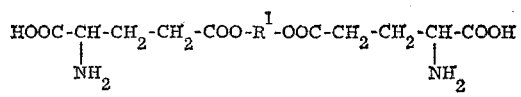

wherein R and R¹ are the same as defined hereinabove, in a solvent mixture consisting essentially of an aromatic hydrocarbon having 6 to 8 carbon atoms and an effective solvent amount up to at most 40% by volume of an organic nitrile selected from the group consisting of acetonitrile, n-propionitrile and isomers thereof, n-butyronitrile and isomers thereof, n-valeronitrile and isomers thereof, n-capronitrile and isomers thereof, enanthonitrile, caprylonitrile, pelargononitrile, caprinitrile, acrylonitrile, crotononitrile, allyl cyanide, malononitrile, succinonitrile, glutaronitrile, adiponitrile, pyruvonitrile, benzonitrile, cyclohexyl cyanide, cyclopentyl cyanide, tolunitrile, benzyl cyanide, naphthonitrile and cyanopyridine, and reacting the resulting suspension with phosgene at a temperature of from 50° C. to the boiling point of the solvent-containing suspension.

2. The process of claim 1, wherein said aromatic hydrocarbon is selected from the group consisting of benzene, toluene and xylene.

3. The process of claim 1, wherein said nitrile has a boiling point of from 50° C. to 300° C.

4. The process of claim 1, wherein the ester residue comprises an alkyl group having 1 to 18 carbon atoms.

5. The process of claim 1, wherein said glutamic acid-γ-ester is selected from the group consisting of γ-methyl-glutamate, γ-ethyl-glutamate, γ-n-propyl-glutamate and isomers thereof, γ-n-butyl-glutamate and isomers thereof, γ-n-pentyl-glutamate and isomers thereof, γ-n-hexyl-glutamate and isomers thereof, γ-n-heptyl-glutamate and isomers thereof, γ-n-octyl-glutamate and isomers thereof, γ-n-nonyl-glutamate and isomers thereof, γ-n-decyl-glutamate and isomers thereof, γ-n-dodecyl-glutamate and isomers thereof, γ-cetyl-glutamate, γ-stearyl-glutamate, γ-oleyl-glutamate, γ-cyclobutyl-glutamate, γ-cyclopentyl-glutamate, γ-cyclohexyl-glutamate, γ-cycloheptyl-glutamate, γ-cyclooctyl-glutamate, γ-cyclononyl-glutamate, γ-cyclodecyl-glutamate, γ-cyclododecyl-glutamate, γ-cyclobutylmethyl-glutamate, γ-cyclopentylmethyl-glutamate, γ-cyclohexylmethyl-glutamate, γ-cyclooctylmethyl-glutamate, γ-methylcyclobutyl-glutamate, γ-methylcyclopentyl-glutamate, γ-methylcyclohexyl-glutamate, γ-methylcyclooctyl-glutamate, γ-phenyl-glutamate, γ-benzyl-glutamate, γ-phenylethyl-glutamate, γ-o-tolyl-glutamate, γ-m-tolyl-glutamate, γ-p-tolyl-glutamate, γ-o-tolylmethyl-glutamate, γ-m-tolylmethyl-glutamate, γ-p-tolylmethyl-glutamate, γ-xylyl-glutamate, γ-α-naphthyl-glutamate, γ-β-naphthyl-glutamate, γ-α-naphthylmethyl-glutamate, γ-β-naphthylmethyl-glutamate, γ-furfuryl-glutamate, γ-furyl-glutamate, γ-tetrahydrofuryl-glutamate, γ-tetrahydrofurfuryl-glutamate, and said glutamic acid-γ-esters substituted by halogen, nitro, and alkoxy, of 1–2 carbon atoms.

6. The process of claim 1, wherein said glutamic acid-γ-ester is selected from the group consisting of γ-methyl-L-glutamate, γ-methyl-D-glutamate, γ-ethyl-L-glutamate and γ-benzyl-L-glutamate.

7. The process of claim 1, wherein said organic nitrile is selected from the group consisting of acetonitrile, propionitrile and acrylonitrile.

8. The process of claim 1, wherein the reaction is conducted at a temperature from 50° C. to 200° C.

9. A process for the preparation of N-carboxylic acid anhydrides of glutamic acid-γ-esters having the formula,

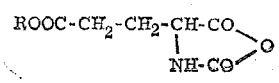

or

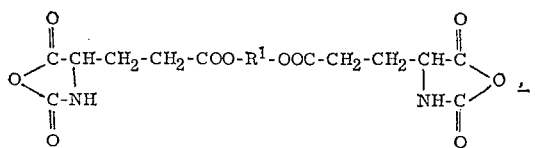

wherein R and R[1] are each an organic ester residue having 1 to 18 carbon atoms, which comprises suspending a glutamic acid-γ-ester having the formula,

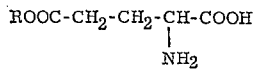

or

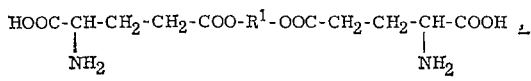

wherein R and R[1] are the same as defined hereinabove, in a solvent mixture consisting essentially of an aromatic hydrocarbon selected from the group consisting of benzene, toluene and xylene and at most 40% by volume of an organic nitrile selected from the group consisting of acetonitrile, propionitrile and acrylonitrile, and reacting with phosgene at a temperature of from 50° C. to the boiling point of the solvent containing suspension.

10. The process of claim 9, wherein the resultant glutamic acid-γ-ester N-carboxylic acid anhydride is recrystallized from a poor solvent therefor.

References Cited

UNITED STATES PATENTS 2,662,084   12/1953   MacDonald _____ 260—307

ALEX MAZEL, Primary Examiner

R. V. RUSH, Assistant Examiner